(12) United States Patent
Laurent (10) Patent No.: US 7,366,224 B2
(45) Date of Patent: Apr. 29, 2008

(54) SYSTEM AND METHOD FOR THE DETECTION OF PRESENCE OF A SIGNAL AND ITS SYNCHRONIZATION, FOR A FREQUENCY HOPPING SYSTEM WORKING IN A DISTURBED ENVIRONMENT

(75) Inventor: Pierre André Laurent, Bessancourt (FR)

(73) Assignee: Thales, Neuilly S/Seine (FR)

( * ) Notice: Subject to any disclaimer, the term of this patent is extended or adjusted under 35 U.S.C. 154(b) by 770 days.

(21) Appl. No.: 10/712,303

(22) Filed: Nov. 14, 2003

(65) Prior Publication Data
US 2004/0136442 A1 Jul. 15, 2004

(30) Foreign Application Priority Data
Nov. 15, 2002 (FR) ................................. 02 14344

(51) Int. Cl.
*H04B 1/69* (2006.01)
(52) U.S. Cl. ................ 375/136; 375/355; 375/365; 375/134; 375/130; 370/441; 370/517; 327/60; 327/58
(58) Field of Classification Search ................ 375/136, 375/355, 130, 134, 365; 370/441, 517; 327/60, 327/58
See application file for complete search history.

(56) References Cited

U.S. PATENT DOCUMENTS

| 5,539,783 | A | * | 7/1996 | Papson ....................... 375/355 |
| 5,625,641 | A | | 4/1997 | Takakusaki |
| 5,629,639 | A | * | 5/1997 | Williams ..................... 327/60 |
| 6,052,406 | A | * | 4/2000 | Epstein et al. .............. 375/134 |
| 6,418,300 | B1 | | 7/2002 | Laurent |
| 6,614,852 | B1 | | 9/2003 | Laurent |
| 2003/0161339 | A1 | * | 8/2003 | Oishi et al. ................. 370/441 |

FOREIGN PATENT DOCUMENTS

JP 58 103248 A 6/1983

* cited by examiner

*Primary Examiner*—Chieh M. Fan
*Assistant Examiner*—Eva Puente
(74) *Attorney, Agent, or Firm*—Lowe Hauptman Ham & Berner, LLP (57) ABSTRACT

A method and device are disclosed for the detection and synchronization of a signal in a frequency-hopping system. The method has a step, for each frequency F(1) . . . F(M), of selecting the K samples corresponding to the greatest values of the signal, and their positions. For a given position, the M greatest values are combined which are selected from among K samples on each frequency having the given position. The greatest combined value is kept and the corresponding position. The greatest combined value is compared with a threshold value, and if the greatest combined value is greater than this threshold value, then the detection of the signal is declared.

15 Claims, 9 Drawing Sheets

FIG.1

Prior Art

FIG.2

Prior Art

FIG.3

Prior Art

FIG.4

Prior Art

FIG.5

Prior Art

FIG.6

Prior Art

SYSTEM AND METHOD FOR THE DETECTION OF PRESENCE OF A SIGNAL AND ITS SYNCHRONIZATION, FOR A FREQUENCY HOPPING SYSTEM WORKING IN A DISTURBED ENVIRONMENT

BACKGROUND OF THE INVENTION

1. Field of the Invention

The invention relates to a system and a method for the detection of the presence of a signal and its synchronization, especially in a frequency-hopping system working in a disturbed environment.

The invention can be applied especially to frequency-hopping systems that work at very low signal-to-noise ratios (particularly those using artificial satellites as relays). For these systems, it relates to the acquisition function which consists, for a participant who is entering the network and is therefore non-synchronized, in detecting the presence of known signals sent at known times and frequencies.

2. Description of the Prior Art

Present-day protected telecommunications systems implement a spread-spectrum method that uses a band for transmission that is far broader than the band strictly needed to transmit payload data.

There are two main principles in existence:

Spread-spectrum communications through the broadening of the band generally obtained by over-modulating the original signal by means of a pseudo-random sequence that is synchronous with the data and has a bit rate close to the total occupied bandwidth, Spread-spectrum communications by frequency hopping (FH) in which the signal is sent by "stages>>" or "levels" of a fixed duration, and in which the frequency is changed pseudo-randomly throughout the occupied band.

In the present description, the term "pseudo-random" means "random for an intruder" and "perfectly known" to a participant in the system who has an ad hoc random generation device, as well as a "key" and a "time" common to all the participants.

Figure 1:
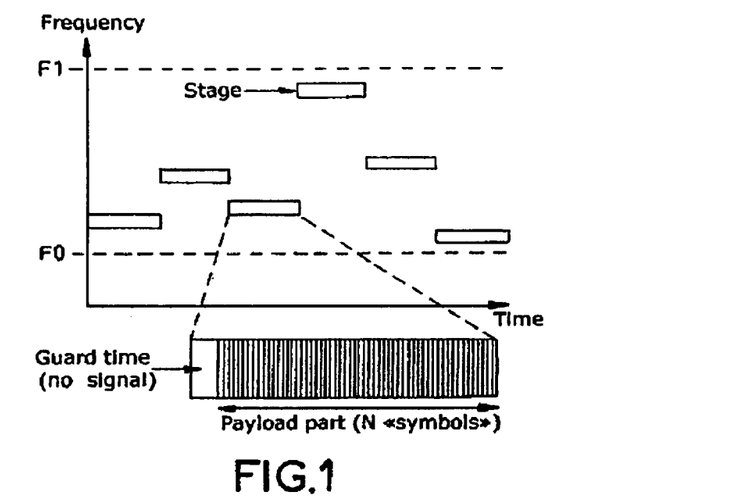
FIGS. 1 to 4 are schematic drawings pertaining to principles of transmission and synchronization according to the prior art.

FIG. 1 shows the principle of a frequency-hopping system in which the occupied band is limited by the two borderline frequencies F1 and F2 that have to work at very low signal-to-noise ratios (particularly those used by artificial satellites working as relays). For these systems, the occupied band is limited to the acquisition function which consists, for a participant entering the network—hence a participant who is not synchronized—in detecting the presence of known signals sent at known instants and frequencies.

Each stage has N elements which may or may not be carriers of information called symbols that are preceded (or followed, this is immaterial) by a guard time designed to minimize interference between approximately synchronized users and leave the receiver the time to "get stabilized" at each new frequency (i.e. the time corresponding to gain control, the frequency synthesizer positioning time, the smear of the filters, etc.).

Figure 2:
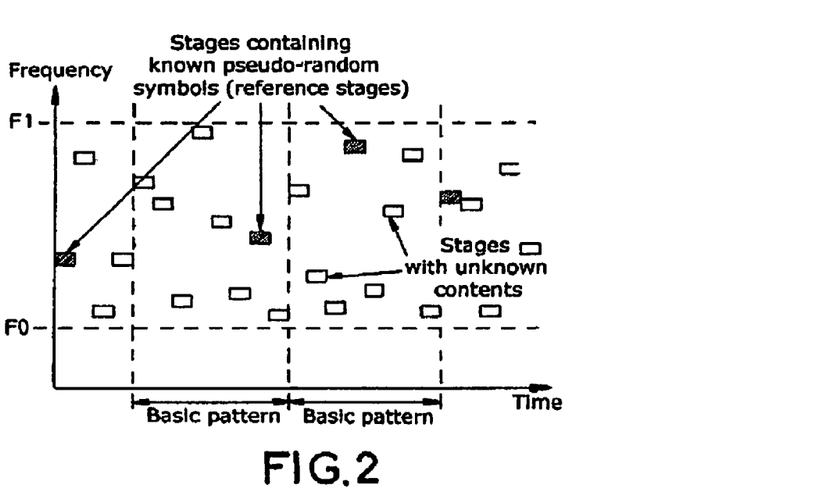

In order to be able to carry out the initial synchronization, as stated further above, known stages (i.e. stages for which the N symbols are known wholly or in part) are sent according to a known law, while the majority of the other stages comprise (almost) only unknown symbols (payload information), as shown in FIG. 2.

It is assumed here (in order to simplify the description) that the time is divided into basic patterns of constant duration, each pattern comprising only a reference stage placed at a position known in advance.

Figure 3:
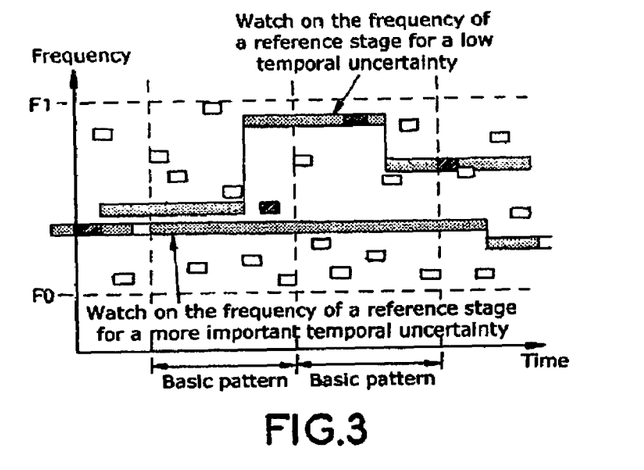

FIG. 3 shows the action of the receiver during the search phase, i.e. when it does not yet know the "reference time" of the system to which it seeks to gain access.

Two situations are shown in this figure, corresponding respectively to the following two cases:

1) The receiver already has an excellent estimate of the time of the system (as seen in the shaded strips at the top): all it does therefore is to keep watch, for a duration equal to a basic pattern, on the frequencies at which the reference stages or levels are located. Thus, if the conditions are suitable, it will sooner or later detect both the presence and the precise position of said stages, from which it will deduce the time resetting that it must perform.

If it has detected nothing at the end of a certain period of time, it will put its clock forward or back by a quantity deduced from the duration of the basic pattern, and will make another attempt at detection.

2) The receiver has only a fairly imprecise estimation of the time of the system (shaded strips at the bottom): it will then keep watch for a duration that is a multiple of the duration of the basic pattern, the multiplier factor being especially great as its temporal uncertainty is greater. The frequency to be watched each time will logically be that of the reference stage which, in principle, should be in the basic pattern located in the middle of the watch duration. In all other respects, the same procedure is used as in the case 1.

Figure 4:
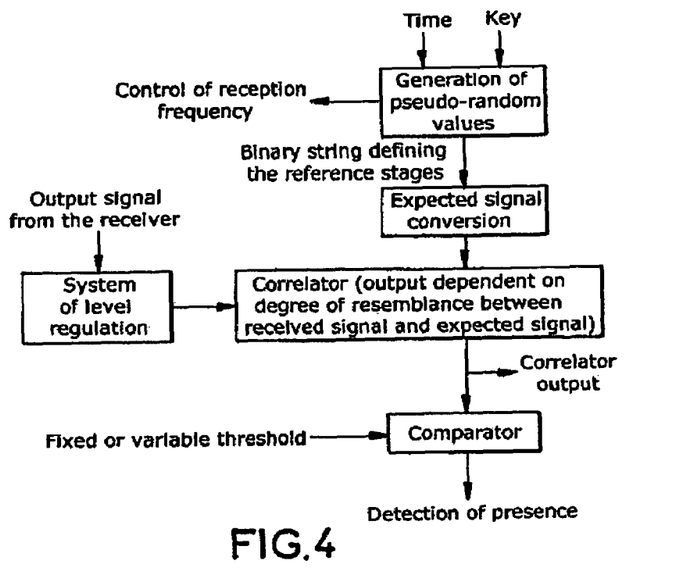

When the signal-to-noise ratio is sufficient or when the probability of scrambling is not excessively high, the receiver uses a presence detection system as described in FIG. 4.

Depending on the local time of the receiver, a random generator delivers the number of the frequency to be watched as well as a binary string which is used to reconstitute the known part of the signal expected on the reference stage to be detected, the unknown part being set at zero.

After any unspecified form of level detection depending on the characteristics of the system and/or on the structure chosen for the receiver, the received signal is compared with the expected signal in a device called a "correlator" (equivalent to a filter "adapted" to the reference signals) whose output is the maximum when:

the received signal truly comprises the right reference symbols at the expected positions, the received signal is perfectly "secured" in the correlator, i.e. each received reference signal "faces" the expected reference signal.

Indeed, if S is the received signal and R is the reference, the output of the correlated at the instant t is given by:

$$Corr(t) = \sum_n S_{t+nT} R_n^*$$

where T is the interval between two reference symbols.

If we overlook the samples which are not references, the receiver signal can take the form:

$$S_{t_o+kT} = GR_k + B_k$$

where G is a complex gain and B is complex noise.

The output of the correlator at the instant to is then given by:

$$Corr(t_0) = \sum_n (GR_n^* + B_n)R_n^*$$

Or again:

$$Corr(t_0) = G\sum_n |R_n|^2 + \sum_n B_k R_n^*$$

Namely G times the sum of the squares of the moduli of the reference symbols with the addition of a random noise.

It can be shown that, statistically, Corr(to) is the maximum of the output of the correlator.

Accessorily, it can also be shown that if the frequency shift of the receiver signal relative to the nominal frequency is slightly too high, the level of correlation decreases rapidly and makes the detection impossible.

A simple solution then consists in considering not the directly received signal, but the signal after a differential demodulation having the form:

$$S_t^d = S_t S_{t-T}^*$$

the correlation being done by replacing the original references with "differential" references, namely:

$$R_n^d = R_n R_{n-1}^*$$

Thus, if the frequency shift of the signal is df, it can easily be shown that the output of the differential demodulator becomes:

$$S'^d_t = S_t S_{t-T}^* = S_t S_{t-T}^* = e^{-j2\pi dfT} e^{-j2\pi dfT} S_t^d$$

which amounts to a simple phase rotation that depends only on the frequency shift.

A fixed or adjustable threshold is put at the output of the correlator. If this threshold is crossed, the receiver declares that it has "acquired" the reference and not the time at which the threshold has been crossed, from which it will deduce the time reset to be made.

Figure 5:
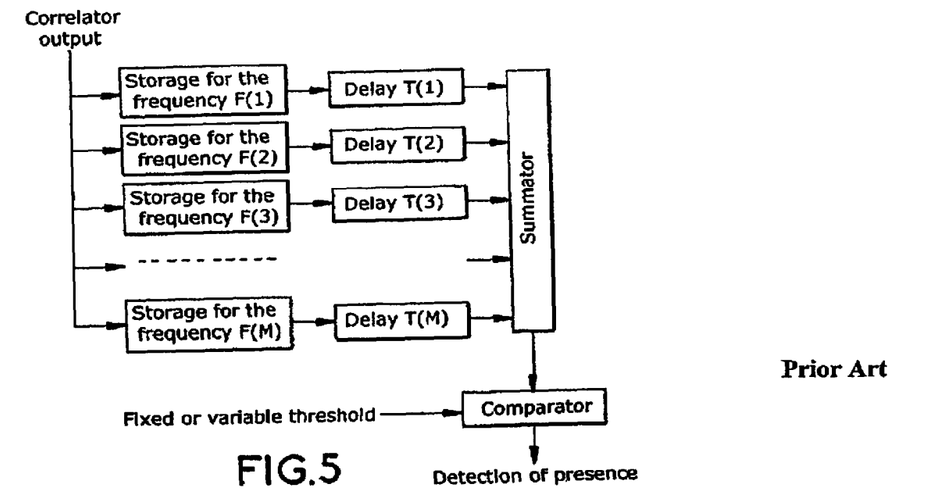
FIG. 5 and 6 are two examples of system architecture according to the prior art, FIG. 7 exemplifies the architecture of the system according to the invention.

FIG. 5 gives a schematic view of an exemplary embodiment according to the prior art.

The receiver tries to recombine the output of the correlator gathered throughout (or almost throughout) the duration of the watch on the frequencies F(1), F(2), . . . , F(M). It must be noted that these are coarse outputs of the correlator, and that the detection threshold mentioned further above is not used.

Given that, on each of these frequencies and if the time shift of the receiver is not too high, the reference stage must reach the instants T(1), T(2), . . . , T(M) plus or minus an unknown constant delay, the receiver then proceeds after the watch on the last frequency (M) as follows:

it carries out a point-by-point summation of the output of the M memories, each delayed by the appropriate quantity (the delay lines are not "physically" indispensable: they may be replaced by appropriate shifts in the memorized read addresses),
  it compares all the sums obtained with a fixed or variable threshold to detect the presence of the signal, as well as its temporal shift.

This embodiment is very costly in terms of memory, especially if the product of the sampling rate (proportional to the modulation speed, the duration of watch (proportional to the temporal uncertainty) and the number of frequencies to be monitored (especially great as the conditions of reception are more severe) is high (amounting to several tens or hundreds of thousands).

Furthermore, for high Doppler shifts, it becomes necessary, even in adopting a differential demodulation pattern at output as referred to further above, to use several devices identical to this one, each corresponding to a given range of frequency shifts ("the Doppler window"), all the devices covering the entire range of Doppler shifts that the system must cope with.

Figure 6:
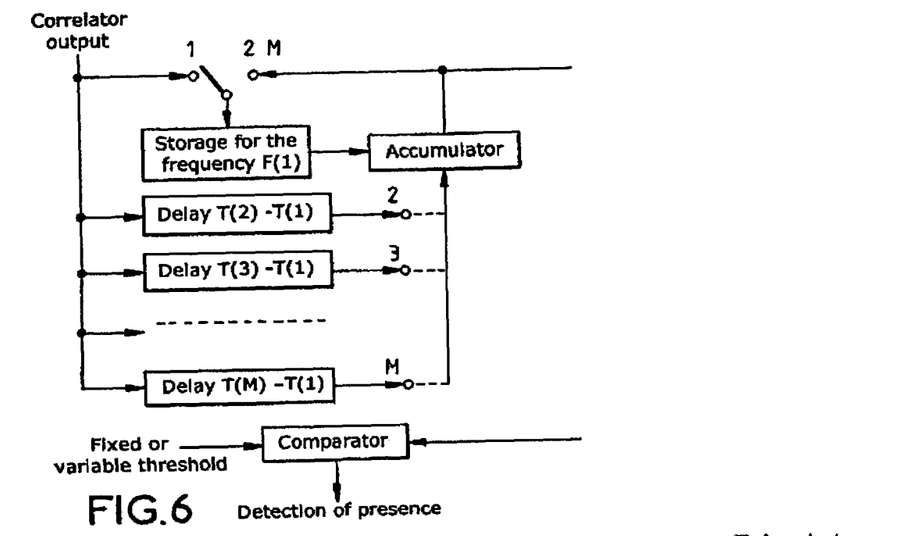

FIG. 6 shows a variant of the system described in FIG. 5, necessitating M times less memory, in which a processing operation is carried out continuously on each frequency to be watched:

on the first frequency to be watched, the operation is limited to the direct storage of the signal coming from the correlator,
  on the following frequencies, the output of the correlator delayed by the appropriate quantity is added to the already stored correlations;
  at the last frequency, the output of the accumulator is compared with a presence detection threshold.

Since some of the differences in delays T(m)–T(1) (with m=2 . . . M) may be negative, and if the reference stages can be located anywhere in the basic pattern, the memory for storing the correlations on the frequency F1 must be widened to contain all the samples corresponding to a basic pattern, or else, symmetrically, if the size of this memory is not modified, the range of temporal uncertainty in which it is possible to unmistakably detect the M reference stages is reduced by the duration of a basic pattern.

However, this embodiment does not avert the need, as the case may be, to cover several Doppler windows and hence make several copies of the system, each being assigned to a Doppler window.

The system and method according to the invention rely on a novel approach to the processing of signals.

They can be applied especially to systems in which the conditions of reception are especially unfavorable (with low signal-to-noise ratios and a very high Doppler shift) where the acquisition by detection of a single reference stage is improbable and where it is therefore necessary to simultaneously detect several stages to obtain the required level of performance.

SUMMARY OF THE INVENTION

The invention relates to a method for the detection and synchronization of a signal in a frequency-hopping system wherein the method comprises at least the following steps:

for each frequency F(1) . . . F(M), selecting the K samples corresponding to the greatest values of the signal, each referenced by an amplitude and a position corrected by a given delay (T(1) . . . T(M)),
  combining, for a given position, the M greatest values selected from among K samples on each frequency having said position, and keeping the greatest combined value and the corresponding position,
  comparing the greatest combined value with a threshold value, and if it is greater than this threshold value, then declaring the detection of the signal.

The method may comprise a step for limiting the level of amplitude of the received signal S, comprising the following steps:

correlating the received signal with the reference number R, for each frequency F(1) . . . F(M), storing the k greatest values of the signal and their position corrected by a known delay T(1) . . . T(M), for a given temporal position, summing the K greatest selected values having this position and preserving the greatest sum, comparing this greatest sum with a threshold value, and if it is greater than this threshold value, then declaring the detection of the signal.

The invention also relates to a device for the detection and synchronization of a signal in a frequency-hopping system, comprising at least the following elements:

several storage devices 6i0, where i is the index of the frequency concerned, the devices being adapted to the storage of the K greatest values for a given frequency as well as their position, a combination device enabling the position-by-position combining of the K greatest values for all the frequency values and the keeping of the greatest value, a comparator receiving, firstly, the value of the threshold to be complied with and, secondly, the greatest value.

Advantages

The object of the present invention has, for example, the following advantages:

It provides an acquisition system structure necessitating the lowest computation capacity and the least memory possible, in return for the lowest possible deterioration of performance relative to the optimum theoretical device, According to an alternative embodiment, the input regulation system is built into the device, it being known that, in the applications in view (increasingly in the future), the upstream part of the receiver is (at least partially) made in digital form and that the input signal is only coarsely regulated, for example only to avoid saturation in the intermediate stages, It gives a regulation system that is the simplest and most efficient possible system.

BRIEF DESCRIPTION OF THE DRAWINGS

Other features and advantages of the present invention shall appear more clearly from the following description, given by way of an illustration that in no way restricts the scope of the invention, along with the appended figures of which.

For a clearer understanding of the principle implemented in the present invention, the following description provides an illustration, that in no way restricts the scope of the invention, of a system working under particularly unfavorable conditions of reception (with a low signal-to-noise ratio and a very strong Doppler shift), where the acquisition by detection of a unique reference stage is highly improbable under the worst conditions of operation and where it is therefore necessary to simultaneously detect several stages to obtain the required performance.

Figure 7:
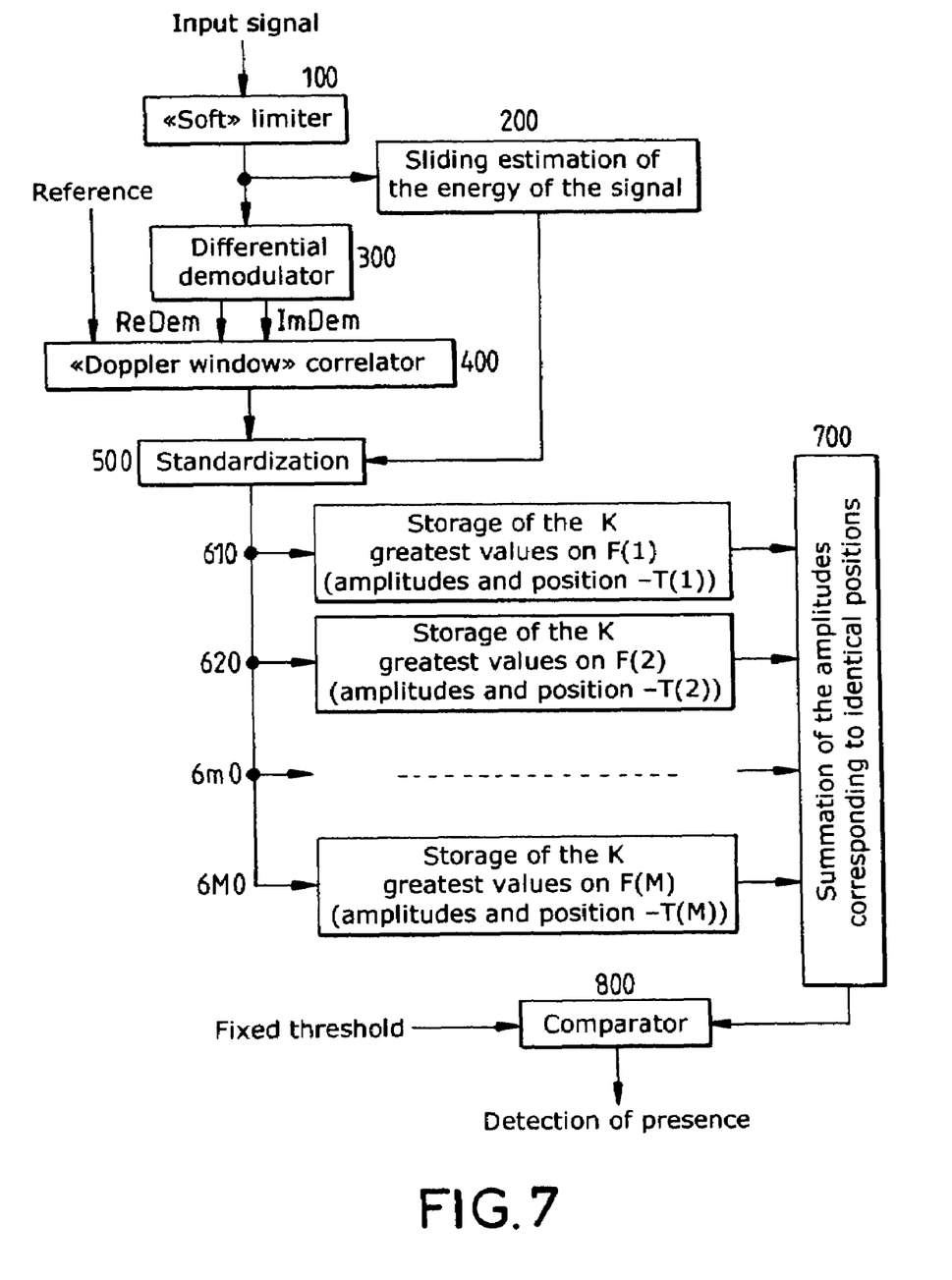

FIG. 7 exemplifies an architecture of the system enabling the initial synchronization of the signal for a lower signal-to-noise ratio and/or in the presence of scramblers, with a high frequency shift that is unknown.

On the whole, the system comprises for example a device 100, or soft limiter adapted to controlling the level of the signal S received by a receiver of the system, a device 200 to estimate the energy of the signal, a differential demodulator 300 receiving the signal and generating a differential signal towards a "Doppler window" correlator 400 which also receives a reference signal R, a device 500 for the standardization of the signal Sc coming from the correlator as a function of the estimated energy, several storage devices 6i0, where i is the index of the frequency concerned, a summator 700 and a comparator 800 receiving firstly the value of a threshold to be complied with and, secondly, the signal coming from the summator. These different elements are described in detail further below in the description.

The different elements of the system work as described here below:

The input signal S which may have a high dynamic range firstly crosses the "soft" limiter 100 whose effect is equivalent to an ultrafast automatic gain control (AGC) system that preserves the linearity of the reception.

In this respect, it is preferred to a "hard" limiter whose (beneficial) effect is that it gives the complex output signal a modulus that is constant but has the drawback, with signal-to-noise ratios below unity (which is the case here), of slightly impairing the output signal-to-noise ratio (a fraction of a dB in excess etc.).

The output of the soft limiter is subjected, for example, to a permanent and sliding estimation of the energy of the signal which will be contained in the correlator by means of the device 200.

Given the size of the Doppler shifts considered, a differential demodulator 300 uses the samples of the output signal of the soft limiter to generate a differential signal, represented by its two components ReDem (real part) and ImDem (imaginary part).

The output of the differential demodulator represents the input of the "Doppler windows" correlator 400 designed to work with a real reference signal (generally in series of +1 and−1).

The output of the correlator is re-standardized by the system 500 as a function of the energy of the signal present in the correlator and permanently computed by the device 200 referred to here above.

For each of the frequencies F(1) . . . F(M) to be watched, the method memorizes only the K greatest output values, where the correlation peak is most likely to appear, as well as their positions l corrected by the theoretical position of the reference level T(1) . . . T(M) in the storage devices numbered 610, 620, . . . , 6M0.

At the end of the acquisition phase, the system 700 takes the sum of the stored amplitudes whose (corrected) positions l are identical, and stores the value of the greatest sum and the corresponding position.

Finally, the comparator 800 compares the greatest sum with a fixed threshold and decides upon the presence of the signal if it has gone beyond a threshold.

Figure 8:
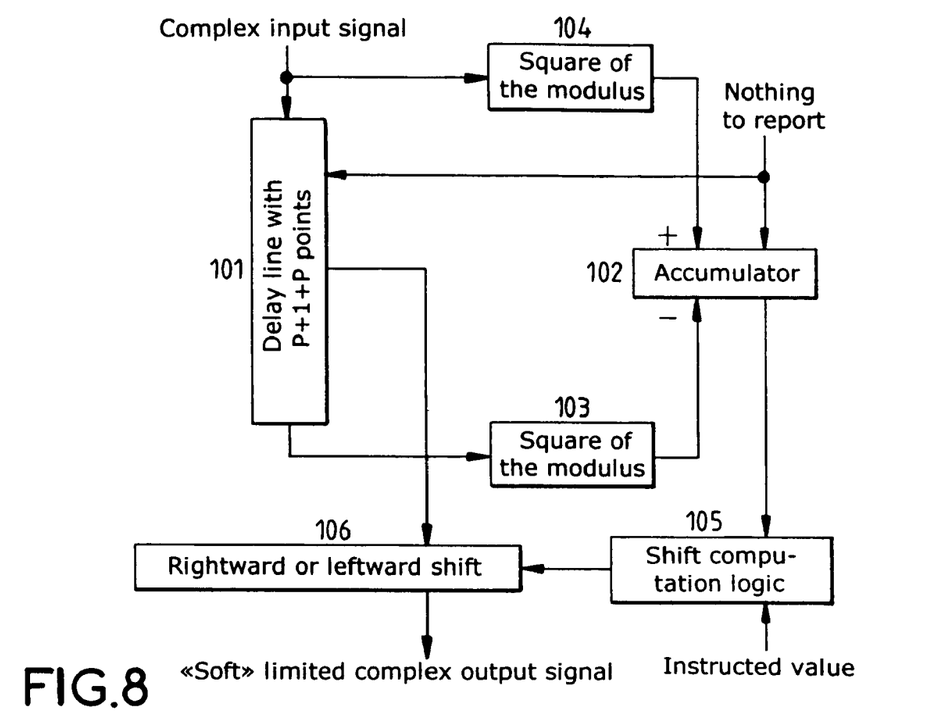
FIGS. 8 to 16 show detailed examples of the different elements constituting the system of FIG. 7.

FIG. 8 shows a detailed exemplary embodiment of the device 100 known as a "soft limiter". The idea is to keep the mean energy within a given range of values [Emin, Emax].

Its principle is firstly to assess the energy of the complex signal received by the receiver contained in a delay line 101 corresponding to a window of +/−P samples on either side of the central sample and including the current sample. This is done by means of an accumulator 102 to which there is added the square of the modulus (104) of the sample of the most recent signal and from which there is subtracted that of the oldest sample (102). The output of the accumulator 102 is always exact, through the initial resetting of the accumulator and of the delay line and through the fact that it is integers that are being dealt with.

The output of the accumulator is then given to a shift computation logic circuit 105 which applies a shift to the shift device 106 such that the output of the accumulator is as close as possible to a given instructed value. This value depends on the hardware implementation envisaged.

At output, the shifter 106 gives a complex signal limited in a soft way or, in other words, a signal whose level is regulated by an "almost instantaneous" AGC system.

It must be noted that, when there is a signal with a constant level present at input, the (constant) output level may vary by a factor of two depending on the value has taken by the input level.

In order to limit the signal level, the method considers for example a section or range of signal that statistically represents an energy value representing the energy of the signal received by the receiver.

Let Et be the value of energy of the signal for a given point in time t,
Let G be a gain to be applied to Et,
Let g be a gain to be applied to the sample to be processed,
  If the product G Et is greater than or equal to Emax,
    then divide the gain G by $n^2$, and the gain g by n,
  Else
  If the product G Et is smaller than or equal to Emin,
    then multiply the gain G by $n^2$, and the gain g by n
  Else
    the value Et is included between Emin and Emax, and there is no reason to modify the gains G and g.

The central sample constituting the output of the "soft limiter" will have to be multiplied by the gain g, whether g has been modified or not.

The values of Emin and Emax are adjusted as a function of the characteristics of the hardware, i.e. the values not to be crossed in the processing operations that follow.

They are also chosen in such a way that, if the mean power of the input signal is (statistically) constant, the modifications of the gains g and G are as infrequent as possible.

In the case of a "fixed decimal point" implementation (using integers), the value of n will preferably be equal to 2, it being known that a multiplication or a division by 2 is expressed by a simple shift to the left or to the right.

Figure 9:
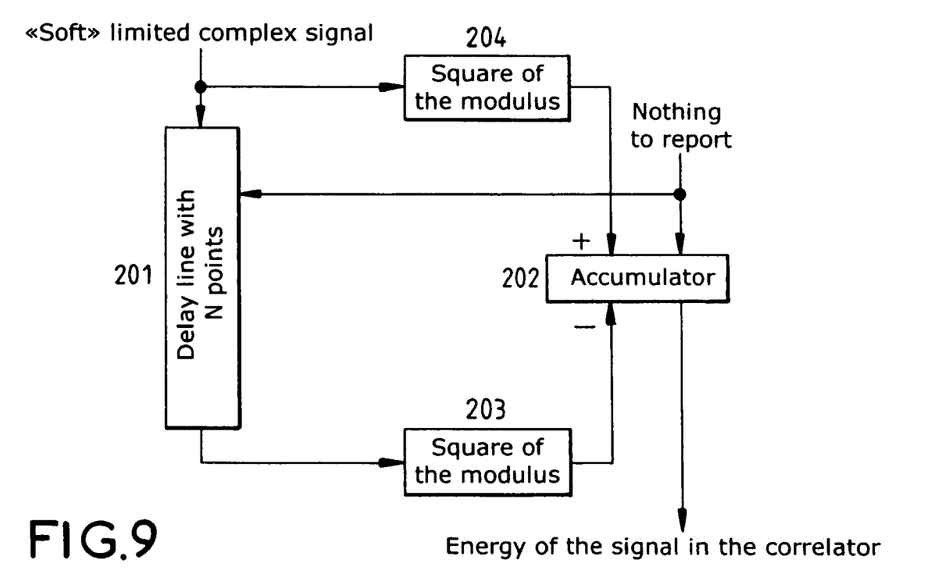

FIG. 9 represents an exemplary device for the sliding estimation of the energy of the signal.

Its principle is similar to that of the "power estimation" part of the soft limiter shown in FIG. 8, and can be applied to the "soft limit" or "soft" complex signal coming from the soft limiter.

After the resetting of a N-point delay line 201 and an accumulator 202, the square of the modulus of the oldest signal samples (203) is subtracted from the accumulator and that of the most recent signal samples (204) is added.

This delay line is sized in such a way that, at each point in time, it contains the totality of the samples that take part in the correlations (Doppler windows).

In a simple variant (not shown here for reasons of simplification), the squares of the moduli themselves are stored in the delay line and the square of the modulus entering the delay line is added to the accumulator and the square of the outgoing modulus is subtracted. This entails an economy of the element 203 for example.

Figure 10:
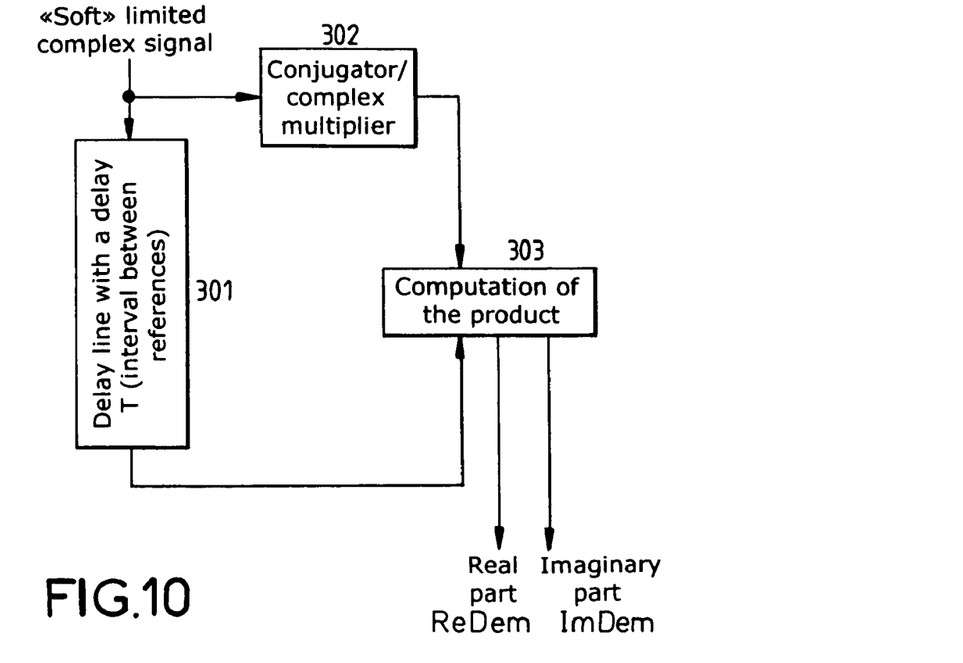

FIG. 10 gives a schematic view of an exemplary differential demodulator.

A delay line 301 gives a delay equal to the time difference between two successive references. A "conjugator" 302 and a complex multiplier 303 are responsible for separately delivering the real part (ReDem ) and the imaginary part (ImDem) of the differentially demodulated signal which will be recombined before correlation with a reference signal R.

Figure 11:
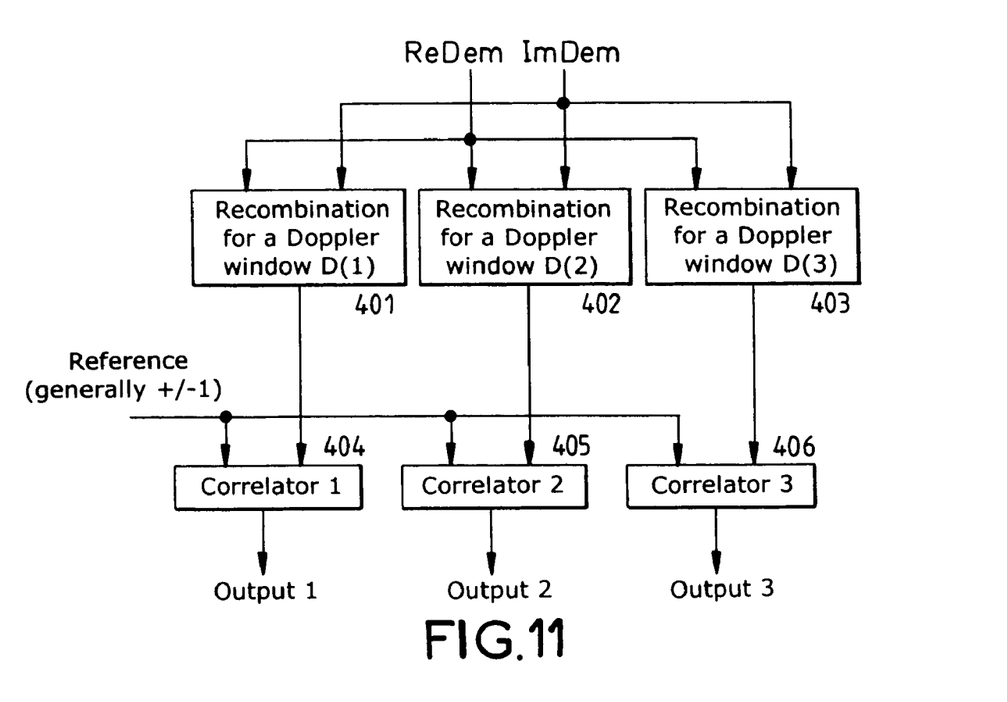

FIG. 11 shows a first exemplary detailed example of the Doppler window correlator with three Doppler windows.

For example, for three Doppler windows, the middle window being centered on the nominal frequency, a device 401 computes comp((ReDem+j ImDem) exp(+j theta)), the device 402 computes comp(ReDem+j ImDem) and the device 403 computes comp((ReDem+j ImDem) exp(−j theta)) where:
  the angle theta correspond to the phase rotation between two reference symbols for the Doppler window considered,
  comp(x) designates a function depending on the system and giving a real number which, as the case may be, is the real part, the imaginary part or any other function of the quantity x. This function is chosen so that correlation may be obtained by a sequence of multiplications by +/−1.

The correlation on the three Doppler windows are performed by correlators 404, 405 and 406 for example as follows:
  if the number of Doppler windows is equal to 1, only one correlator is necessary.
  if it is equal to 2, two correlators are necessary.
  if it is greater than or equal to 3, the following variant (FIG. 12) shows how it is possible to use only two correlators in any case.

Figure 12:
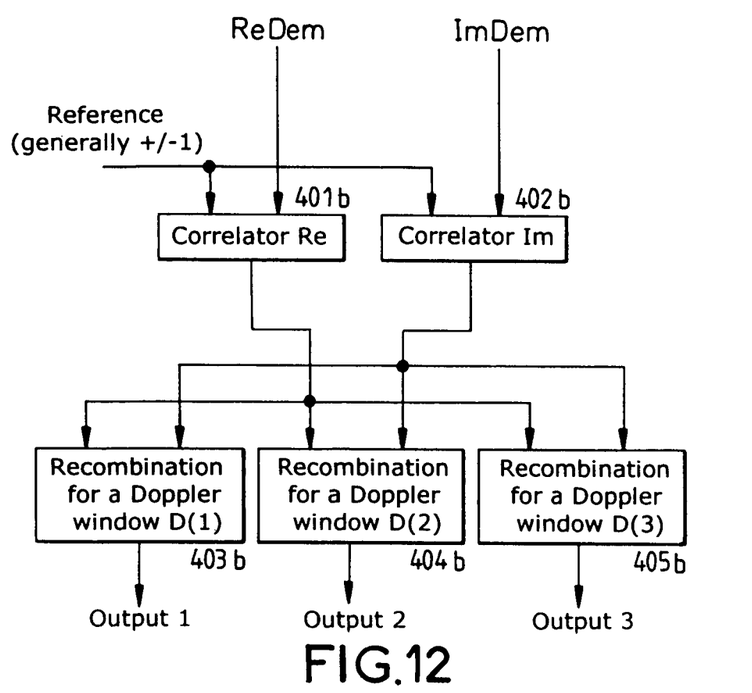

FIG. 12 shows a second detailed example of a correlator with "Doppler windows".

Indeed, since the correlation is a linear correlation, it is possible to perform the correlations only on the signal ReDem and ImDem by means of the correlators 401*b* and 402*b*, and to recombine the outputs by means of the devices 403*b*, 404*b* and 405*b* (always in the case of three Doppler windows) which perform operations similar to those of the above-mentioned devices 401, 402 and 403.

Figure 13:
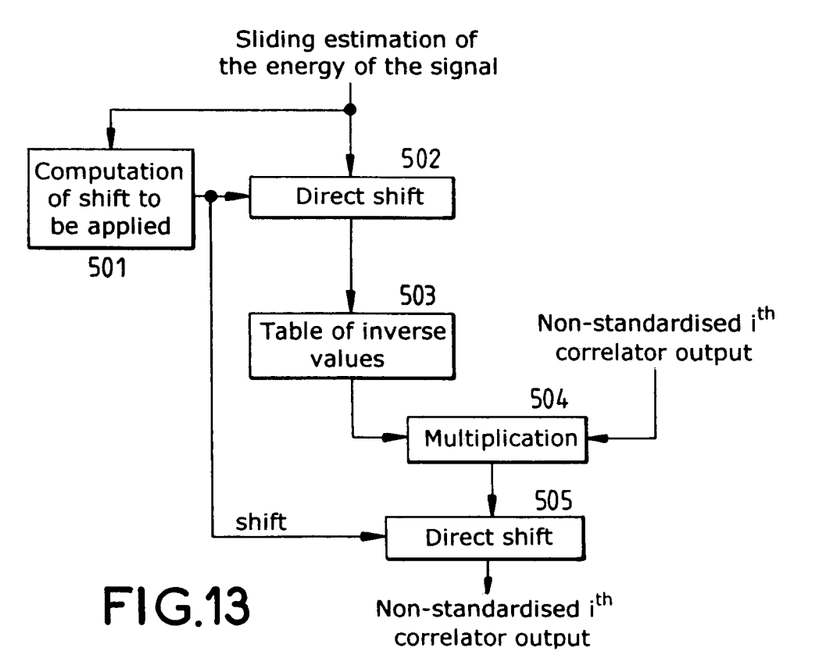

FIG. 13 describes an exemplary device used to standardize the output of the correlators.

The elements 501 and 502 are used to find the shift by which the sliding estimation of the energy of the signal participating in the correlation can be converted into a valid address in the table of inverse values 503.

The non-standardized output of the $i^{th}$ correlator is multiplied in an adapted device 504 by the output of the table, and undergoes a shift by the shifter 505 which makes it possible to restore the (the approximate) value that would have been obtained by a true division, namely the output of the $i^{th}$ standardized correlator.

Figure 14:
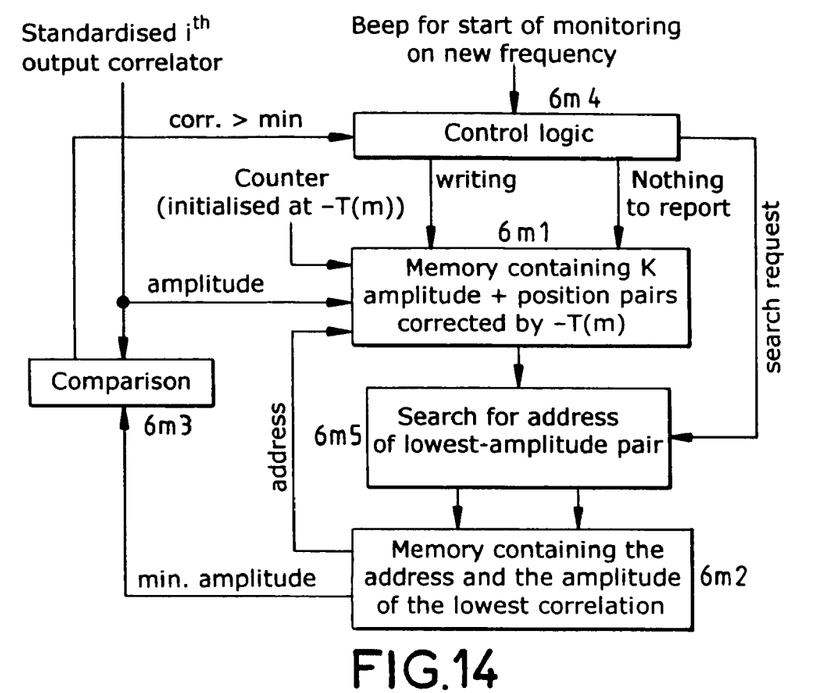

FIG. 14 exemplifies a device used to store the K greatest values on F(m). The pairs (amplitudes and positions −T(m)) are stored.

For the m-ranking frequency to be watched, the memory 6*m*1 contains the pairs relating to the temporal amplitude+ position of the K greatest correlations that have appeared hitherto. The memory 6*m*2 contains the amplitude of the lowest correlation contained in the memory 6*m*1, as well as its address in this memory.

When a new value of the standardized correlation appears, it is compared by means of the comparator 6m3 with the minimum value chosen up to then:

if it is lower than the minimum value, nothing happens, if it is higher than the minimum value, then the new correlation replaces the old smaller correlation (i.e. it is stored along with its corrected position at its address) and a system 6m5 is responsible for the identification, among the K pairs contained in the memory 6m1, of that pair whose amplitude is the lowest, and of transferring its address and amplitude into the memory 6m2.

The assembly is controlled by a command logic 6m4 which is furthermore responsible for resetting the system at the beginning of the search.

Figure 15:
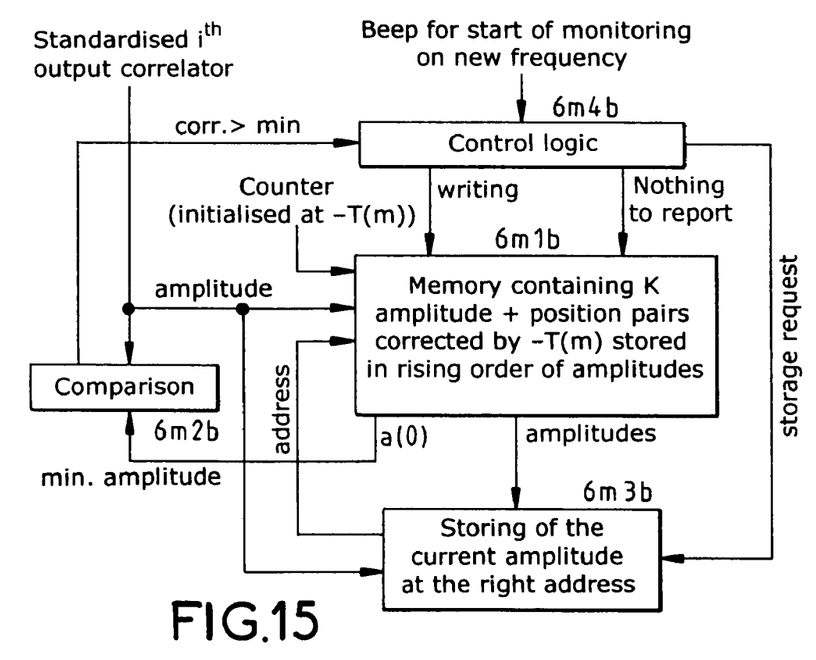

FIG. 15 represents a variant of FIG. 14.

This time, a memory 6m1b contains the pairs (amplitude, position) systematically arranged in the rising order of amplitudes.

The value a(0) represents the amplitude stored at the address 0, which is the smallest of all the amplitudes.

If the comparator 6m2b detects that the current output of the concerned correlator is greater than a(0), the system 6m3b takes responsibility for modifying the contents of the memory 6m1b so that the new amplitude is either stacked in the right place, given that the amplitude a0 (and the corresponding position) will have been eliminated. These operations are performed under the control of the command logic 6m4b which is responsible among other things for resetting operations.

In the second procedure, there are on an average only (approximately) K/2 comparisons to be performed in order to assign the right place to the new correlation, instead of (approximately) K comparisons in the first correlation. However it is then necessary, on an average, to make an upward or downward shift, by one address, of the pairs (amplitude, position) located on either side of the new correlation.

Figure 16:
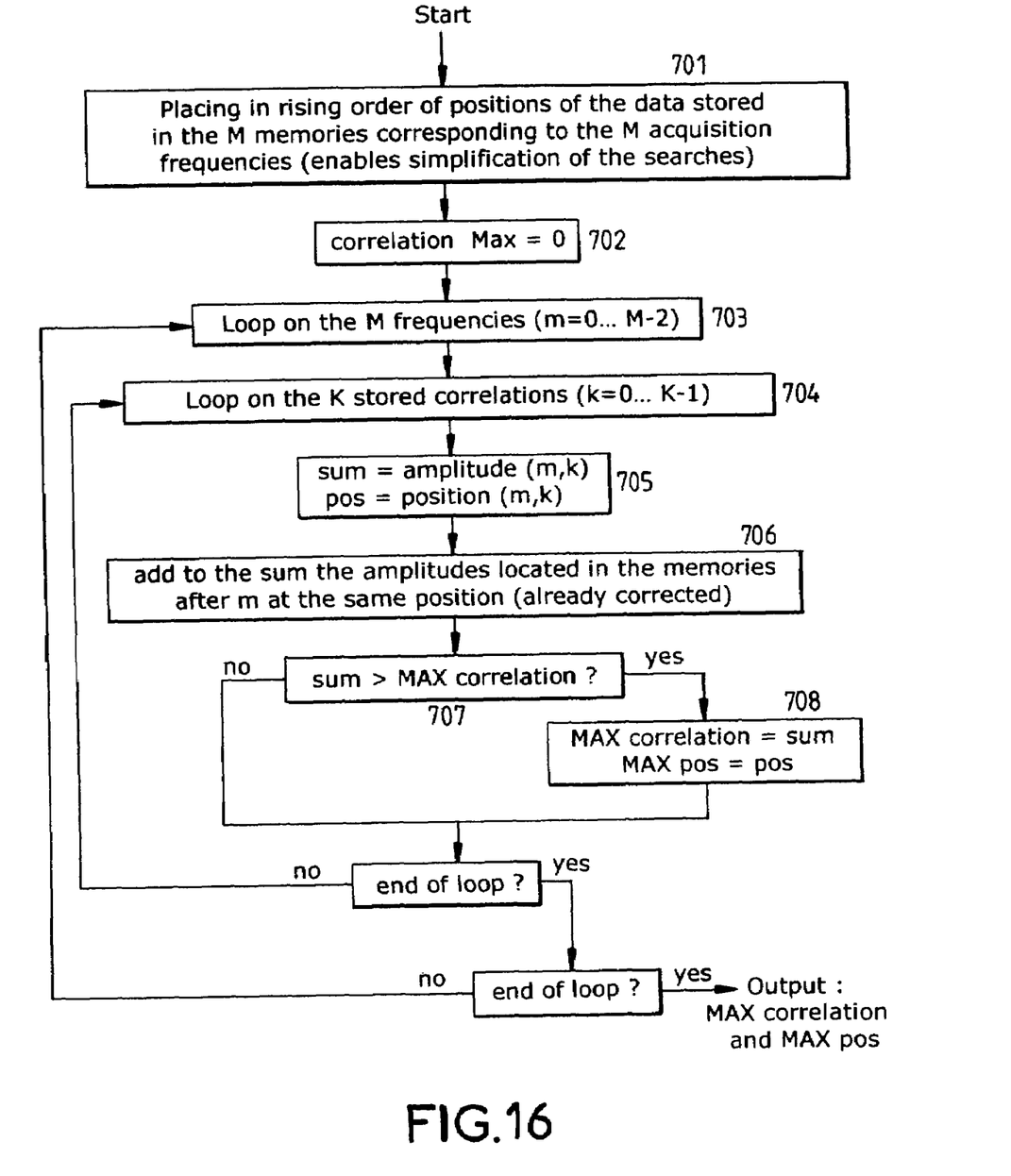

FIG. 16 describes an exemplary system of the final summation of the different "greatest chosen values".

The following system of final summation gives a view, in the form of a flow chart, of the method that makes it possible, on the basis of the contents of the memories of the device 600, to decide on the absence or presence of reference stages on the M frequencies.

At the outset, for convenience's sake, the pairs (amplitude, position) are rearranged (701) in the memories in rising order of the positions. This can be done very easily by algorithms of the "Quick-Sort" type whose relation to the simple storing algorithms (known as "Bubble Sort") is the same as the relation of the FFT (Fast Fourier Transform) to the DFT (Discrete Fourier Transform), these algorithms being known to those skilled in the art.

The advantage is that if, in the memory, an address A is found corresponding to a value of position, it is certain that the address at which a higher position will be found will be an address higher than A (the search will therefore begin at the address A+1, instead of 0).

The value of the "MAX correlation" (702) is then set at zero.

For each frequency (703) and for all the positions stored for this frequency (704), the amplitudes corresponding to the same position are added to this frequency (step 705) and in the following frequencies.

If the sum obtained is greater than the "MAX correlation" (707), the "MAX correlation" is identified with the sum and the position of the maximum ("pos MAX") and the position examined (708).

The value of the final output is the value of the "MAX correlation", accompanied by "pos MAX". This is the value that is compared with a fixed threshold in the comparator 800 to decide whether or not the signals(the references) were present and, if so, at which temporal position they were present.

In the different variants explained here above, the hardware implementation can be performed as follows:

to perform a division by n, which is very costly in terms of computation capacity, the closest integer (precomputed and put on a table) will be multiplied for example by $2^\wedge$ k/n, and will be divided than by $2^\wedge$ k, which is done simply by a k-position rightward shift, the complications are made for example on "fixed decimal point" numbers (integers or fractions) and, provided certain precautions are taken, always give a precise result, to the extent possible, preference will be given to multiplication subdivisions by powers of 2 (rightward or leftward shifts) to the detriment of other values, thus preventing the computation of said other values, the output samples of the correlator or correlators, in their majority, consist of "noise" samples of no interest and take no part whatsoever in the detection of presence. It is sought therefore to keep only the correlation samples that are worthy of interest in order to save on memory.

What is claimed is:

1. A method for detection and synchronization of a signal in a frequency-hopping system, the method comprising the following steps:

for each frequency F(1) . . . F(M), selecting the K samples corresponding to the greatest values of the signal, and their positions;

combining, for a given position, the M greatest values each selected from among K samples on each frequency having said given position, generating combined values for each position and keeping the greatest combined value and the corresponding position;

and comparing the greatest combined value with a threshold value, and if the greatest combined value is greater than the threshold value, then declaring the detection of the signal.

2. The method according to claim 1, further comprising the following steps:

limiting the amplitude level of the received signal S;

correlating the received signal with the reference number R for each said frequency F(1 . . . F(M), storing the K greatest correlation values of the signal and their position corrected by a know delay T(1) . . . T(M); and for a given temporal position, summing the K greatest selected values having this position and preserving the greatest sum as the greatest combined value.

3. The method according to claim 2, wherein said limiting step comprises the following steps:

using a sliding window to select a signal section (zone);

estimating the energy of the signal on this section; and varying the gain applied to the signal so that, ultimately, its short-term energy remains in a given fixed time interval for the majority of the time.

4. The method according to claim 3, wherein a delay line or a circular memory is used as a sliding window.

5. The method according to claim 1, wherein, for an m-ranking frequency to be watched, the amplitude/position pairs of the K greatest values that have appeared being known and a new correlated value being higher than the minimum value previously chosen, the former minimum value is replaced by the new correlated value;

a search is made among the K pairs for the pair whose amplitude is the lowest; and parameters of the lowest pair are stored.

6. The method according to claim 5, wherein the correlated new value is compared with the different amplitudes stored in a rising order of amplitude, and as soon as this new value is higher than one of the amplitudes, the new correlated value as well as its corrected position are stored.

7. The method according to claim 1, wherein said combination step comprises the following steps:

initializing a <<MAX correlation>> value at 0;

for each frequency F(m) and for all the positions stored for this frequency, adding the amplitudes corresponding to the same position to this frequency and in the following frequencies;

obtaining a sum greater than the <<MAX correlation>> value, identifying the <<MAX correlation>> value with the sum and the position of the maximum <<MAX position>> at the position examined;

selecting the final value as being the value of "MAX correlation" accompanied by "pos MAX" in order to determine the detection of the signal.

8. A device for the detection and synchronization of a signal in a frequency-hopping system, comprising:

several storage devices, each of the devices being adapted to memorizing the K greatest values for a corresponding given frequency as well as their positions;

a combination device enabling the position-by-position combining of the K greatest values for all the frequency values to generate several combined values and the keeping of the greatest combined value; and a comparator receiving, firstly, the value of a threshold to be compared with and, secondly, the greatest combined value.

9. The device according to claim 8, wherein the combination device is a summator.

10. The device according to claim 8, comprising a soft limiter adapted to controlling the level of the signal and a correlator that also receives a reference signal R.

11. The method according to claim 5, wherein the parameters are in an amplitude and corrected position.

12. The method according to claim 2, wherein, for an m-ranking frequency to be watched, the amplitude/position pairs of the K greatest values that have appeared being known and a new correlated value being higher than the minimum value previously chosen, the former minimum value is replaced by a new correlated value;

a search is made among the K pairs for the pair whose amplitude is the lowest; and parameters of the lowest pair are stored.

13. The method according to claim 3, wherein for an m-ranking frequency to be watched, the amplitude/position pairs of the K greatest values that have appeared being known and a new correlated value being higher than the minimum value previously chosen, the former minimum value is replaced by the new correlated value;

a search is made among the K pairs for the pair whose amplitude is the lowest; and parameters of the lowest pair are stored.

14. The method according to claim 4, wherein, for an in-ranking frequency to be watched, the amplitude/position pairs of the K greatest values that have appeared being known and a new correlated value being higher than the minimum value previously chosen, the former minimum value is replaced by the new correlated value;

a search is made among the K pairs for the pair whose amplitude is the lowest; and parameters of the lowest pair are stored.

15. The device according to claim 9, comprising a soft limiter adapted to controlling the level of the signal and a correlator that also receives a reference signal R.

* * * * *